March 23, 1926. 1,578,244
V. HILLFORD
CONTROL MECHANISM FOR AUTOMOBILES
Filed Oct. 16, 1924
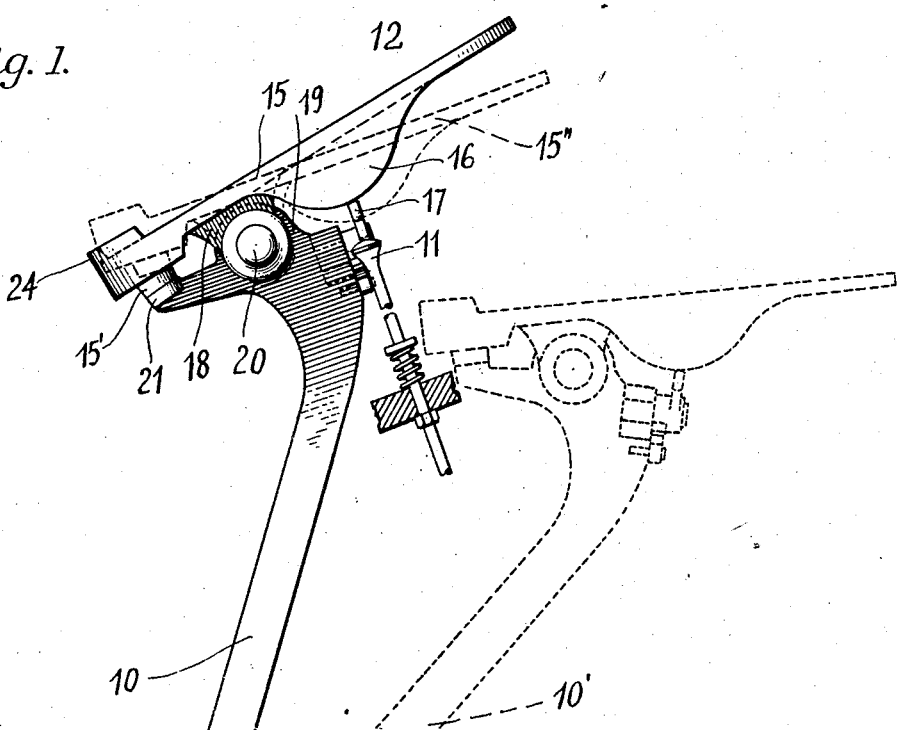
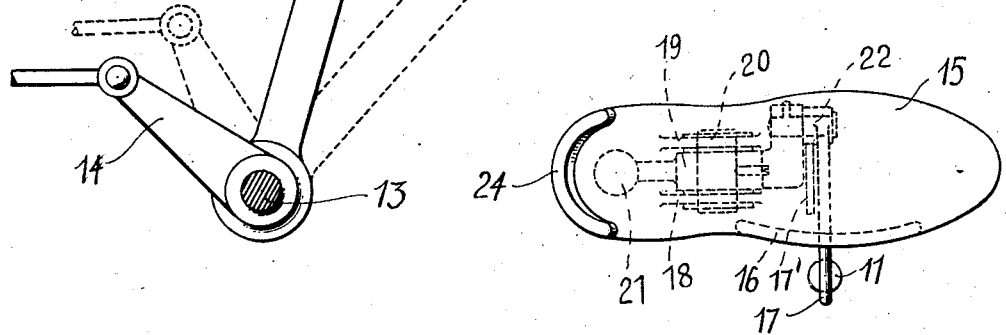
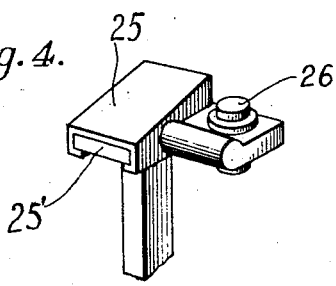
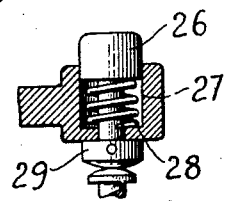
VINCENT HILLFORD,
Inventor.
By his Attorney Julian J. Wittal Patented Mar. 23, 1926.

1,578,244

UNITED STATES PATENT OFFICE.

VINCENT HILLFORD, OF NEWARK, NEW JERSEY.

CONTROL MECHANISM FOR AUTOMOBILES.

Application filed October 16, 1924. Serial No. 744,078.

*To all whom it may concern:*

Be it known that I, VINCENT HILLFORD, a citizen of Hungary, and resident of Newark, in the county of Essex and State of New Jersey, have invented certain new and useful Improvements in Control Mechanisms for Automobiles, of which the following is a specification.

This invention relates to control mechanisms for automobiles.

The principal object of the present invention is to overcome the vital disadvantage of the arrangement on an automobile of the brake control means such as the brake lever or the brake foot pedal, and the accelerator which forms a part of the fuel supplying and regulating means of the motor of the automobile; the arrangement being such that it requires two separate and distinct operations, namely, the withdrawal of pressure being applied to the accelerator and its application to the brake pedal by the same foot of the operator to bring the automobile to a standstill or the not infrequent alternative of a collision with another automobile or pedestrian with the possibility of great destruction and loss of life. The present invention contemplates the provision of means whereby the brakes of the automobile may be applied and the fuel to the engine cut off simultaneously with one foot of the operator in an instant, and at the proper time followed by the release of the brakes with the foot still in place for the admission of fuel to the engine.

Another object of the invention is to produce mechanism of the character mentioned as standard equipment of an automobile, or in the nature of a device as an accessory to be applied in operative conjunction with the brake control part and the accelerator already on the automobile; means being provided to take care of the variance of distance between the brake pedal and the accelerator on one automobile compared to another.

With the foregoing and other objects in view, the invention resides in the particular construction and operation of parts hereinafter fully described and illustrated in the accompanying drawing, in which:

Figure 1 is a sectional elevation in which is shown a conventional form of a brake control foot pedal which is a part of the ordinary brake of an automobile, and a conventional form of accelerator which is part of the ordinary fuel supplying and regulating means of an automobile, and the device of the present invention combined with said brake control foot pedal and said accelerator.

Figure 2 is a plan view of the rocker treadle with parts shown in dotted lines.

Figure 3 is an end view.

Figure 4 is a perspective view of a modified form of device used for actuating the accelerator.

Figure 5 is a detail sectional view of the actuator embodied by the device shown in Figure 4.

Referring now more particularly to Figures 1, 2 and 3, it will be apparent that there has been shown a brake control foot pedal 10, which constitutes a part of the ordinary brake of a motor vehicle or automobile, an accelerator 11, of the press type, which constitutes a part of the ordinary fuel supplying and regulating means of the motor or engine of said motor vehicle or automobile, and means 12, carried by the pedal 10, for facilitating the operation of the pedal and for actuating the accelerator 11 to increase the fuel supply to the engine or to release the same to cut off the supply of fuel to slow the engine. It is to be understood that the usual hand throttle is employed to start the engine. The pedal 10, in the present instance is mounted for rocking movement to braking and non-braking positions on a shaft 13, and has a part 14 to which is connected the usual brake rod. The means 12 is arranged at the upper end of the pedal 10. The means 12 comprises a rocker 15 having a stop 15', and a rib 16; and an actuator 17. The rocker is connected for rocking movement by virtue of lugs 18 on the rocker an ear 19 on the pedal 10, and a bolt 20, which passes through the apertures in the lugs 18 and the ear 19. The rocker 14 serves as the tread portion of the pedal and for actuating the actuator. The pedal has a stop 21 which coacts with the stop 15 on the rocker to limit the movement of the latter in one direction and thus give the desired rigidity for the proper operation of the pedal to braking position. The actuator 17 is pivotally connected to the pedal 10 as at 22, and a spring 23 is employed to hold the actuator normally in contact with the rib 16. On the same hub with the actuator 17 an additional arm 17' may also be secured, inwardly of the actuator and below the same, so as to facilitate the action of the spring 23 on the actuator 17. The actuator 17 is elongated to reach to the accelerator 11 so that a portion of the former will be in juxtaposition to the latter; the arrangement being such that when the pedal is in non-braking position, the actuator 17 will be out of contact with the accelerator but capable of being moved into contact therewith to impart pressure thereto to increase the fuel supply to the engine when the rocker 14 is rocked forwardly and downwardly, as shown in dotted lines at 15'', and when it is desired to apply the brakes the pedal is moved forwardly and downwardly with the stop 15' in contact with the stop 21, as shown in its dotted position at 10'; and the accelerator 11 is released to assume a normal condition, therefore the supply of fuel will be decreased with the engine throttled down. The rocker 14 has a ridge or upturned portion 24 against which the heel of the operator's shoe abuts to prevent the foot from slipping as will be understood.

It will be obvious from inspecting the drawings and by the above description that normally my device is in the position shown with full lines in Fig. 1, the operator's foot resting lightly on the same.

In case an acceleration of the automobile is needed, the operator tilts his foot forwardly and brings the rocker 15 into a position indicated by the dotted lines, as at 15'', and thereby exerts a desired amount of pressure on accelerator 11. When, on the other hand, a sudden stopping of the vehicle is necessary, the whole of the pedal mechanism 10 and rocker 15 will be moved into the dotted position indicated at 10', by a sudden full forced push of the leg of the operator, the rocker 15 being automatically kept in its position shown with full lines in Fig. 1 and avoiding the accelerator 11 which will keep the fuel supply shut.

In the form of the device for actuating the pedal and accelerator actuator shown in Figures 4 and 5, the tread portion 25 is wedge shaped in longitudinal section to conform to the interior wedge shape of the attaching flanged plate 25' which carries an actuator 26 in the nature of a plunger operable in a bore 27. A spring 28 is disposed with one end against a wall of the bore 27 and the opposite end against a shoulder of the plunger; a nut 29 preventing the displacement of the plunger. In this form of device the accelerator is actuated by exerting downward pressure on the plunger 26, with a tilting motion of the foot, when the pedal is in the non-braking position. In other respects the action of the mechanism will be the same as is incident to the other form of the invention.

What I claim is:

1. In a motor vehicle, in combination, means to actuate the usual brake mechanism of the vehicle, means to control the fuel supply of the vehicle, a pivoted treadle on said first mentioned means whereby a direct pressure by the foot of the operator will cause a braking effect on the vehicle, a normally inoperative connection between said treadle and said fuel controlling means whereby a forward tilting of the treadle by the toes of the operator will cause said means to increase the fuel supply to the vehicle, said connection comprising a transverse lever pivoted on said treadle over said fuel controlling means and a spring to normally keep said lever out of engagement with said fuel controlling means.

2. In a motor vehicle having the usual foot lever the angular forward movement of which is designed to actuate the usual brake mechanism of the vehicle, a pivoted treadle on said lever, cooperating stops on the heel part of said treadle and on the brake lever, a transversal actuating lever pivoted on said brake lever underneath the forward or toe portion of said treadle, a spring to normally press said transverse lever against said treadle and said treadle against its stop on said brake lever, a fuel controlling element underneath said transverse lever normally out of contact with but being adapted to be actuated by the same when said treadle is tilted forwardly by a pressure of the toes of the operator, the arrangement and angles of said brake lever and said treadle being such that a direct full pressure by the foot of the operator on the treadle will cause an angular forward movement of said brake lever and result in the braking of the vehicle, the arc of the angular movement of said brake lever and the mechanisms thereon clearing said fuel controlling means.

VINCENT HILLFORD.